United States Patent
Frazier

(10) Patent No.: US 6,571,345 B1
(45) Date of Patent: May 27, 2003

(54) DUAL-TIMER PROCESS CONTROL SYSTEM

(75) Inventor: Giles R. Frazier, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/473,812

(22) Filed: Dec. 28, 1999

(51) Int. Cl.$^7$ ..................... G06F 15/16; G06F 15/177; G06F 1/04
(52) U.S. Cl. ..................... 713/502; 713/500; 713/600; 370/235; 370/350; 709/227; 709/228; 709/237
(58) Field of Search ............................. 713/500, 502, 713/600; 370/235, 350; 714/55; 709/227, 228, 237

(56) References Cited

U.S. PATENT DOCUMENTS 6,076,114 A * 6/2000 Wesley ..................... 714/748
6,199,068 B1 * 3/2001 Carpenter ..................... 707/100
6,215,782 B1 * 4/2001 Buskens et al. ............. 370/350
6,289,452 B1 * 9/2001 Arnold et al. ............... 713/167

* cited by examiner

Primary Examiner—Thomas Lee
Assistant Examiner—James K. Trujillo
(74) Attorney, Agent, or Firm—Floyd A. Gonzalez; Cantor Colburn LLP

(57) ABSTRACT

A dual-timer process control system (10) includes a process control timer (28) used to limit the number of iterations of a procedure whose duration is controlled by an iteration timer (22). At system (10) startup, the iteration timer (22), process control timer (28) and procedure are started. The iteration timer (22) times out after a first predetermined amount of time and provides an iteration stop signal to stop the procedure. The iteration timer (22) and procedure are started again if the process control timer (28) has not timed out. If the iteration timer (22) and the process control timer (28) have timed out, the process is performed n−1 additional times, where n is the minimum number of iterations of the procedure.

17 Claims, 3 Drawing Sheets

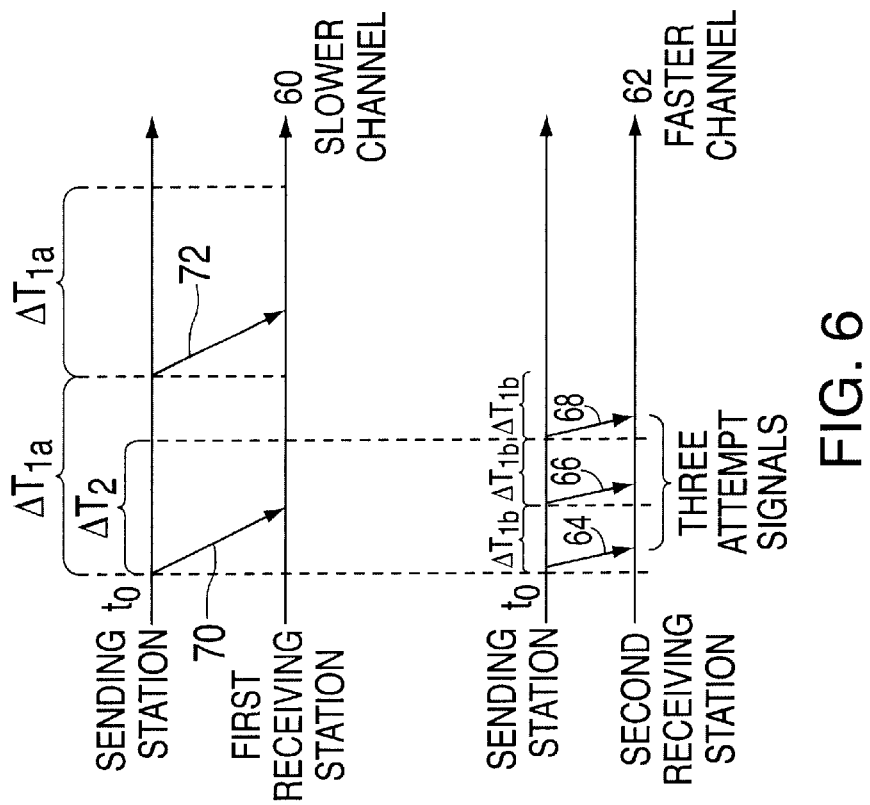
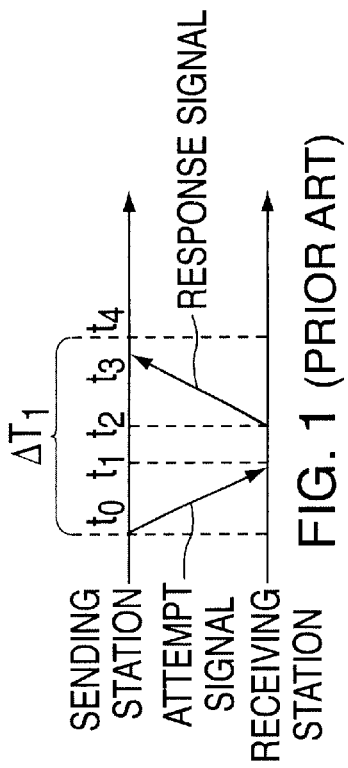
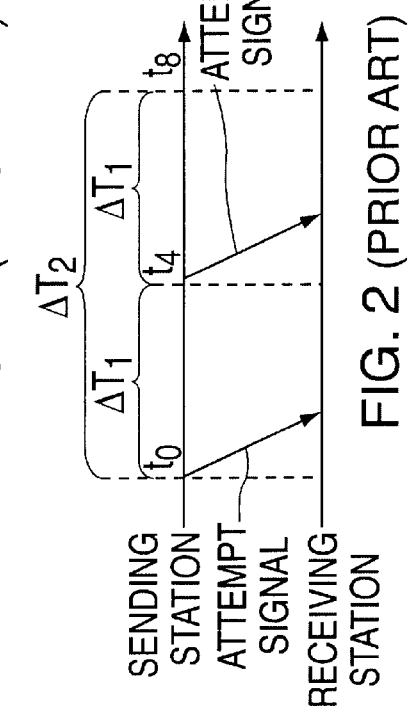
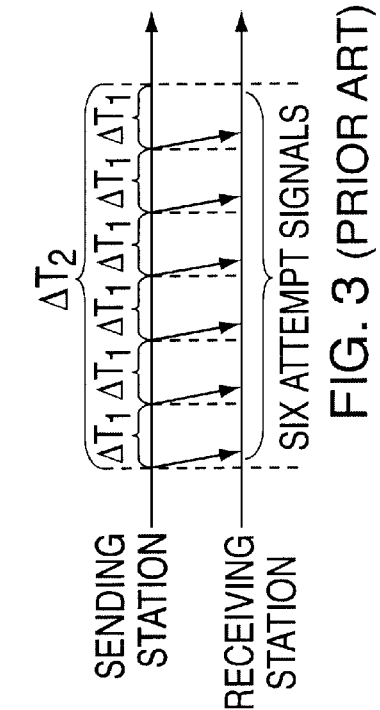

DUAL-TIMER PROCESS CONTROL SYSTEM

FIELD OF THE INVENTION

This invention is related to the control of a timed process using multiple timing devices, and, more specifically, to the control of a timed process wherein one timer is used to set a limit on the operation of another timer.

BACKGROUND OF THE INVENTION

Computer communications networks typically employ some sort of handshaking process where a sending station sends a signal to a receiving station then waits a first predetermined time for a response from the receiving station. If there is no response from the receiving station within a first predetermined amount of time, the sending station sends another signal and waits again for a response. The sending computer continues this process until the receiving station responds or until a second predetermined time has elapsed. This type of handshaking process may be used, for example, in routines for verifying a logical path (channel) connection between the sending and receiving stations in a dynamically connected communications network.

The handshaking process described above requires the use of at least two timers. An iteration timer to limit the duration of each iteration to the first predetermined amount of time, and a process control timer to limit the total number of iterations to those that can be completed in the second predetermined amount of time. Typically, these timers are implemented in an input/output control program (IOCP) operating in the sending station. The IOCP controls a number of communication channels between the sending station and a plurality of receiving stations.

FIG. 1 depicts a successful communication between the sending and receiving stations. As can be seen in FIG. 1, the sending station provides an "attempt" signal at time t0. At time t1, this signal is received by the receiving station, the difference between t0 and t1 being the propagation delay due to factors such as distance between the sending and receiving station or the type of communications medium between the sending and receiving stations. After the signal is received, the receiving station processes the signal and provides a response signal at a time t2. The difference between t1 and t2 being the processing time of the receiving station. The response signal is then received at the sending station at a time t3, the difference between t3 and t2 being attributable to propagation delay. After the signal is received, it is then processed by the sending station, and the successful handshaking process is complete at a time t4. The iteration timer is set to time out after the first predetermined amount of time, $\Delta T1$, which starts at time t0 and ends at time t4 so that another attempt signal can be sent immediately if the sending station determines that the receiving station has not responded.

FIG. 2 depicts an unsuccessful communication attempt between the sending and receiving stations. The sending station provides an attempt signal at time t0. The iteration timer then waits the first predetermined amount of time, $\Delta T1$, and signals the IOCP to provide another attempt signal. When no response is received at the end of the second predetermined amount of time, $\Delta T2$, the process control timer times out and the process is stopped. The second predetermined amount of time is equal to a multiple "n" of the first predetermined amount of time, where "n" is the number of handshaking attempts (iterations).

There are many factors that dictate the setting of the iteration timer, $\Delta T1$, including the propagation time between the sending and receiving stations, and the processing time of the sending and receiving stations. Because these factors vary with different channels, it is necessary for the iteration timer to be configurable. That is, $\Delta T1$ must be lengthened and shortened to accommodate the response time of different channels. However, if $\Delta T1$ is made greater than the setting of the process control timer, $\Delta T2$, the process will be terminated by the process control timer before a response signal is received. To avoid this, $\Delta T2$ is increased to allow "n" attempts of the handshaking process.

Increasing both the iteration and process control timers to accommodate slower channels may be acceptable for a system having one process control timer and one iteration timer for each channel. However, for systems employing one process control timer for a number of channels, reconfiguring both the iteration and process control timers can lead to delays in the processing of faster channels. Take, for example, a system having one process control timer for two channels, with each channel having its own iteration timer. If one of the channels provides a relatively fast response time and the other of the channels provides a relatively slow response time, the process control timer must be configured for "n" number of attempts of the slow channel. Thus, while the slow channel will make "n" or fewer attempts, the fast channel may make many more than "n" attempts before the process control timer stops the process. This result can be seen by a comparison of FIGS. 2 and 3. FIG. 3 shows a timing diagram for an unsuccessful communication attempt between sending and receiving stations having a faster communication channel than the network shown in FIG. 2 and with the same process control timer setting as shown in FIG. 2. The result of setting the process control timer to ensure 2 attempts for the slower channel of FIG. 2 is six attempts by the faster channel of FIG. 3. The additional attempts by the faster channel, caused by the increase of $\Delta T2$, increases inefficiency in the communications network for the faster channel.

SUMMARY OF THE INVENTION

In an exemplary embodiment of the invention, a dual-timer control system includes an iteration timer arranged for providing an iteration stop signal a first predetermined amount of time after a system start time, and a process control timer arranged for providing a process stop signal a second predetermined amount of time after the system start time. The dual-timer control system also includes a process unit arranged to start a procedure at the system start time and stop the procedure in response to the iteration stop signal. The process unit is also arranged to perform the procedure n−1 times in response to the procedure stop signal, where n is a minimum number of iterations of the procedure.

Because the process unit performs n−1 more iterations after the process control timer has timed out, the process control timer can be set to time out earlier than the iteration timer. Thus, for systems employing one process control timer for a number of procedures, the process control timer can be set to time out after n iterations of the faster procedures. As a result, the present invention reduces the number of additional, inefficient iterations of the faster procedures.

BRIEF DESCRIPTION OF THE DRAWINGS

FIG. 1 a timing diagram for a successful communication attempt between sending and receiving stations in a computer communications network;

FIG. 2 is a timing diagram for an unsuccessful communication attempt between the sending and receiving stations in a computer communications network;

FIG. 3 is a timing diagram for an unsuccessful communication attempt between sending and receiving stations having a faster communication channel than the network shown in FIG. 4 and with the same process control timer setting as shown in FIG. 4;

FIG. 6 is a timing diagram for an unsuccessful communication attempt between the sending and receiving stations in a computer communications network employing the process of FIG. 5.

DETAILED DESCRIPTION OF THE INVENTION

Figure 4:
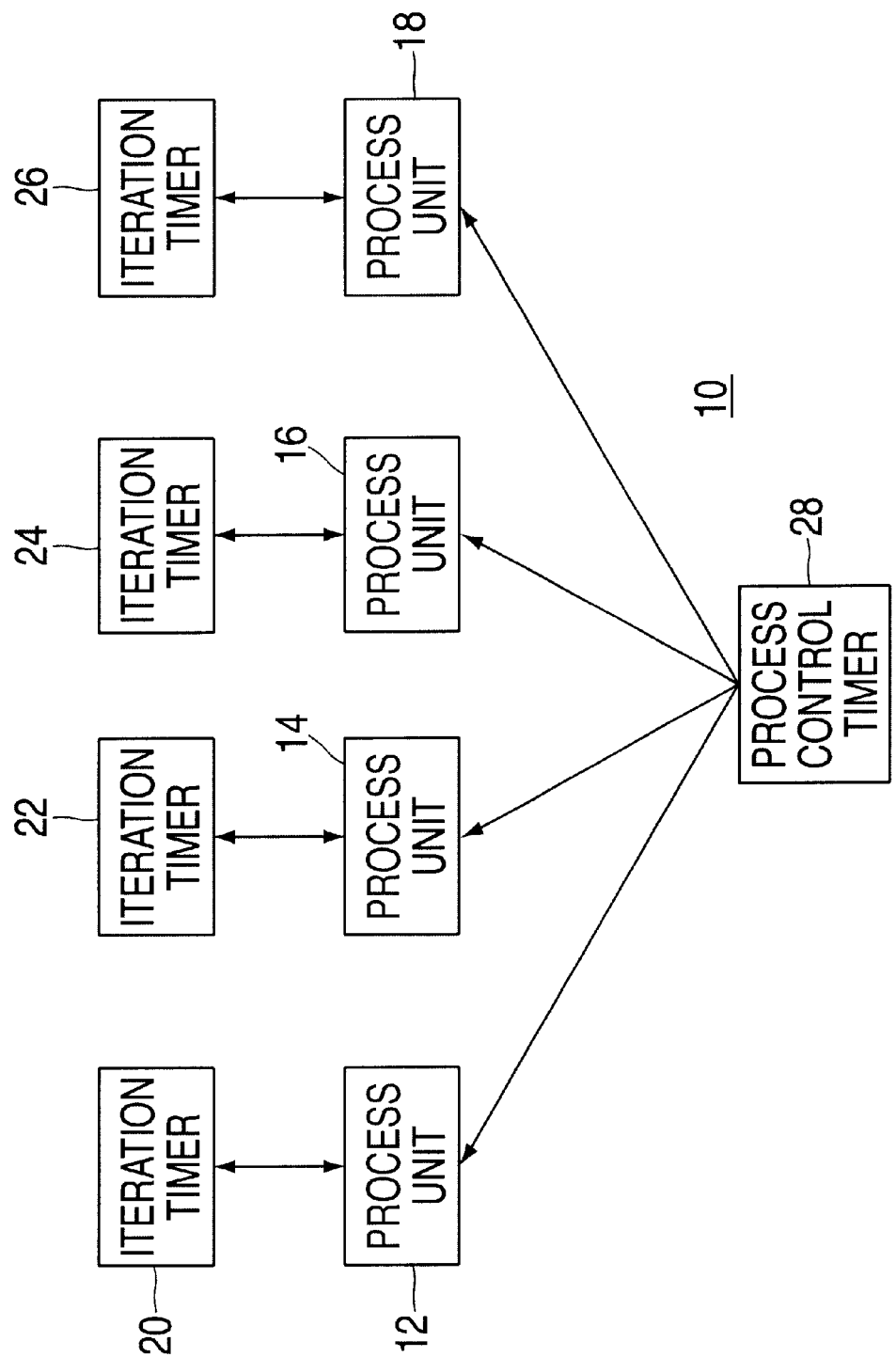
FIG. 4 is a dual timer control system of the present invention.

As shown in FIG. 4, a dual timer control system 10 includes a plurality of process units 12, 14, 16, 18, each arranged to send and receive data signals to and from a plurality of iteration timers 20, 22, 24, 26. Dual timer control system 10 further includes a process control timer 28 arranged to send data signals to process units 12, 14, 16, 18. Each process unit 12, 14, 16, 18 performs some procedure requiring a number of iterations, with the duration of each iteration being limited by the associated iteration timer 20, 22, 24, 26 and the total number of iterations being limited by the process control timer 28, as described in further detail hereinafter. Process units 12, 14, 16, 18 and timers 20, 22, 24, 26, 28 represent, for example, portions of an electronic circuit or routines or objects in a program running on a computer.

At system startup, process control timer 28 provides a process start signal to each of the process units 12, 14, 16, 18 and begins timing all process units 12, 14, 16, 18. Upon receipt of the process start signal, each process unit 12, 14, 16, 18 provides an iteration start signal to its associated iteration timer 20, 22, 24, 26 and then starts the performance of some procedure. In response to the iteration start signal, iteration timers 20, 22, 24, 26 begin timing the procedure. The time to complete the procedure may be different for each process 20, 22, 24, 26. For example, the procedure of process 12, 14, 16 units may take 1 second to complete, while the procedure of process unit 18 may take 10 seconds to complete. Iteration timers 20, 22, 24, 26 are set to time out after a period of time equal to or greater than the completion time of the process controlled by their corresponding procedure units 12, 14, 16, 18 thus setting a limit on the time to complete the process. Using the example above, iteration timers 20, 22, 24 would be set to time out after 1 second, while iteration timer 26 would be set to time out after 10 seconds. Upon timing out, each iteration timer 20, 22, 24, 26 provides a procedure restart signal to its associated process unit 12, 14, 16, 18. In response to the procedure restart signal, the process unit 12, 14, 16 or 18, first determines if a process end signal has been received from process control timer 28. If no process end signal has been received, indicating that process control timer 28 has not timed out, then the process unit 12, 14, 16 or 18 begins the sequence again by starting its procedure and providing an iteration start signal to its associated iteration timer 20, 22, 24 or 26. If a process end signal has been received, indicating that the process control timer 20, 22, 24 or 26 has timed out, then the process unit 12, 14, 16 or 18 performs n−1 more iterations of its procedure, where n is the desired minimum number of iterations for each process unit 12, 14, 16 and 18. After performing the n more iterations, process units 12, 14, 16, 18 return to their pre-startup state.

Importantly, because each process unit 12, 14, 16, 18 performs n−1 more iterations after the process control timer 28 has timed out, the process control timer 28 can be set to time out earlier than one or more of the iteration timers 20, 22, 24, 26. As a result, the process control timer 28 can be set to time out after n or more iterations of the faster process units, even if this amount of time is less than the time to complete fewer than n iterations of the slow process unit. The benefit of this arrangement can be seen using the above example. If the desired minimum number of iterations, n, for each process unit 12, 14, 16, 18 is two, the process control timer 28 of the control system 10 of the present invention can be set to time out after two seconds (i.e. two iterations of process units 12, 14, 16), rather than twenty seconds, as would be required for dual timer control systems of the prior art. Thus, the dual timer control system 10 of the present invention reduces the number of additional, inefficient iterations performed by the faster process units 12, 14, 16.

Figure 5:
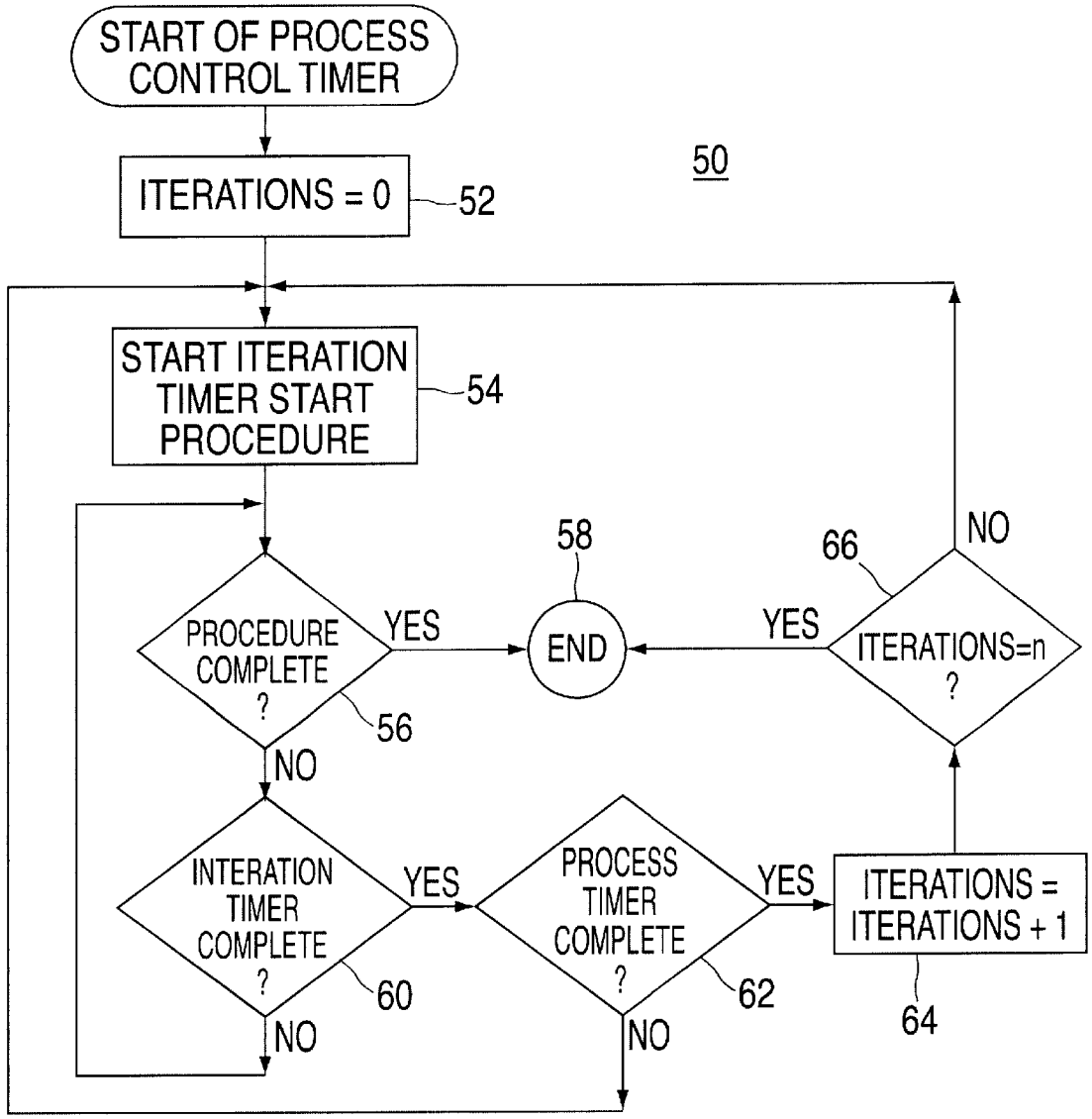
FIG. 5 is a flow chart showing a method employed by the dual timer control system of FIG. 4.

FIG. 5 is a flow chart showing a method 50 employed by each of the process units 12, 14, 16, 18 within the dual timer control system 10 of FIG. 4. Once the process control timer 28 starts, the process unit 12, 14, 16 or 18 sets its iteration counter to zero at a block 52. At block 54, the associated iteration timer 20, 22, 24, 26 is started along with the procedure to be attempted by the process unit 12, 14, 16 or 18. The process continues to block 56 where the status of the procedure is checked. If the procedure is completed (i.e. the attempt is successful), the process ends at block 58. If the procedure is not completed, then the process continues to block 60 where the status of the iteration timer 20, 22, 24 or 26 is checked. If the iteration timer 20, 22, 24 or 26 is completed (timed out) then the process continues to block 62. If the iteration timer is incomplete (still running), then the process returns to block 56. At block 62, the status of the process control timer 28 is checked. If the process control timer 28 is incomplete (still running), the process continues to block 54 where the iteration timer 20, 22, 24 or 26 and procedure are started again. If the process control timer 28 is complete (timed out), the process continues to block 64 where an iteration counter is incremented. From block 64 the process continues to block 66, where the iteration counter is compared to the desired number of iterations "n". If the value stored in the iteration counter is less than the desired number of iterations, the process continues to block 54 where the iteration timer 20, 22, 24 or 26 and procedure are started again. If the number of iterations is equal to the number desired, the process ends at block 58.

FIG. 6 is a timing diagram for an unsuccessful communication attempt between sending and receiving stations along two channels in a computer communications network employing the method 50 of FIG. 5. In the network depicted, the sending station is attempting to communicate with first and second receiving stations via channels 60 and 62, respectively. The communications channel 60 between the sending station and the first receiving station is slower than the communications channel 62 between the sending station and the second receiving station. Therefore, the iteration timer for channel 60 is set to time out after a greater duration of time, $\Delta T1a$, than the iteration timer for the second channel 62, which is set at $\Delta T1b$. The process control timer is set to $\Delta T2$, where $\Delta T2 = 2 \times \Delta T1b$ and $\Delta T2 < \Delta T1a$. The desired minimum number of iterations (n) for each process unit within an input/output control program (IOCP) is two.

Referring first to channel 62, at time t0, the process control timer and a first iteration timer are started and a first process unit in the sending station starts its procedure by providing an attempt signal 64 (block 54) to the second receiving station. Because no response is received, the procedure is not complete (block 56) and the iteration timer times out after ΔT1*b* (block 60). At this time, the process control timer is still running (block 62). Therefore, the iteration timer is re-started and a second attempt signal 66 is provided (block 54). When no response is received at the end of the end of ΔT2, the process control timer times out (block 62). An iteration register in the first process unit is incremented to a value of one (block 64). Because the number of iterations is less than "n" (block 66), the iteration timer is re-started and a third attempt signal 68 is provided (block 54). The iteration timer times out after ΔT1*b* (block 60), and the iteration register in the first process unit is incremented to a value of two (block 64). The number of iterations is equal to "n" (block 66) and the process is ended (block 58).

Referring to channel 60, at time t0, a second iteration timer is started and a second process unit in the sending station starts its procedure by providing an attempt signal 70 (block 54) to the first receiving station. Because no response is received, the procedure is not complete (block 56) and the iteration timer times out after ΔT1*a* (block 60). At this time, the process control timer has timed out (block 62). Therefore, an iteration register in the second process unit is incremented to a value of one (block 64). Because the number of iterations is less than "n" (block 66), the iteration timer is re-started and a second attempt signal 72 is provided (block 54). The iteration timer times out after ΔT1*a* (block 60), and the iteration register in the second process unit is incremented to a value of two (block 64). The number of iterations is equal to "n" (block 66) and the process is ended (block 58).

As is shown in FIG. 6, a computer communications network employing the method 50 of FIG. 5 guarantees that the minimum number of iterations is performed in each of the channels while reducing the number of additional, inefficient iterations performed by the faster process units from the prior art method, which was described FIGS. 3 and 4.

The present invention can be embodied in the form of computer-implemented processes and apparatuses for practicing those processes. The present invention can also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While a preferred embodiment has been shown and described, various modifications and substitutions may be made thereto without departing from the spirit and scope of the invention. Accordingly, it is to be understood that the present invention has been described by way of illustration and not limitation.

What is claimed is:

1. A method for controlling a procedure using dual timers, the method including:

starting the procedure;

starting the procedure again if a first predetermined amount of time has elapsed since the procedure was last started and a second predetermined amount of time has not elapsed since the procedure was first started; and performing the procedure n−1 additional times if the first predetermined amount of time has elapsed since the procedure was last started and the second predetermined amount of time has elapsed since the procedure was first started, where n is a minimum number of iterations of the procedure.

2. The method of claim 1, further including:

stopping the procedure if the procedure is complete.

3. The method of claim 1 wherein the procedure includes:

providing a signal to a channel in a computer communications network; and waiting for a response from the channel.

4. The method of claim 3, further including:

stopping the procedure if the response is received from the channel.

5. The method of claim 1 wherein said performing the procedure n−1 additional times includes:

incrementing a value if the first predetermined amount of time has elapsed since the procedure was last started and the second predetermined amount of time has elapsed since the procedure was first started;

comparing the value with a value indicative of n; and starting the procedure again if the value is less than the value indicative of n.

6. A dual timer control system comprising:

an iteration timer arranged for providing an iteration stop signal a first predetermined amount of time after a start time;

a process control timer arranged for providing a process stop signal a second predetermined amount of time after said start time; and a process unit arranged to start a procedure at said start time and stop said procedure in response to said iteration stop signal, said process unit being further arranged to perform said procedure n−1 times in response to said procedure stop signal, where n is a minimum number of iterations of said procedure.

7. The dual timer control system of claim 6, wherein said process unit is further arranged to stop the procedure if the procedure is complete.

8. The dual timer control system of claim 6, wherein said procedure includes providing a first signal to a channel in a computer communications network and waiting for a response from said channel.

9. The dual timer control system of claim 8, wherein said procedure further includes stopping the procedure if sent response is received from said channel.

10. A storage medium encoded with machine-readable computer program code for control of a procedure using dual timers, the storage medium including instructions for causing a computer to implement a method comprising:

starting the procedure;

starting the procedure again if a first predetermined amount of time has elapsed since the procedure was last started and a second predetermined amount of time has not elapsed since the procedure was first started; and performing the procedure n−1 additional times if the first predetermined amount of time has elapsed since the procedure was last started and the second predetermined amount of time has elapsed since the procedure was first started, where n is a minimum number of iterations of the procedure.

11. The storage medium of claim 10 further comprising instructions for causing a computer to implement:

stopping the procedure if the procedure is complete.

12. The storage medium of claim 10, wherein the procedure includes:

providing a signal to a channel in a computer communications network; and waiting for a response from the channel.

13. The storage medium of claim 12 further comprising instructions for causing a computer to implement:

stopping the procedure if the response is received from the channel.

14. The storage medium of claim 10, wherein said performing the procedure n−1 additional times includes:

incrementing a value if the first predetermined amount of time has elapsed since the procedure was last started and the second predetermined amount of time has elapsed since the procedure was first started;

comparing the value with a value indicative of n; and starting the procedure again if the value is less than the value indicative of n.

15. The method of claim 1, further comprising:

starting a second procedure;

starting the second procedure again if a third predetermined amount of time has elapsed since the second procedure was last started and the second predetermined amount of time has not elapsed since the second procedure was first started; and performing the second procedure n−1 additional times if the third predetermined amount of time has elapsed since the second procedure was last started and the second predetermined amount of time has elapsed since the second procedure was first started.

16. The dual timer control system of claim 6, further comprising:

a second iteration timer for providing a second iteration stop signal a third predetermined amount of time after said start time; and a second process unit arranged to start a second procedure at said start time and stop said second procedure in response to said second iteration stop signal, said second process unit being further arranged to perform said procedure n−1 times in response to said procedure stop signal.

17. The storage medium of claim 10 further comprising instructions for causing a computer to implement:

starting a second procedure;

starting the second procedure again if a third predetermined amount of time has elapsed since the second procedure was last started and the second predetermined amount of time has not elapsed since the second procedure was first started; and performing the second procedure n−1 additional times if the third predetermined amount of time has elapsed since the second procedure was last started and the second predetermined amount of time has elapsed since the second procedure was first started.

* * * * *